United States Patent [19]

Saitou

[11] Patent Number: 5,696,979
[45] Date of Patent: Dec. 9, 1997

[54] RESETTING APPARATUS FOR A MICROCOMPUTER

[75] Inventor: Hiroyo Saitou, Konan-machi, Japan

[73] Assignee: Zexell, Tokyo, Japan

[21] Appl. No.: 772,844

[22] Filed: Dec. 24, 1996

Related U.S. Application Data

[63] Continuation of Ser. No. 354,853, Dec. 9, 1994, abandoned.

[30] Foreign Application Priority Data

Dec. 10, 1993 [JP] Japan .................. 5-341536

[51] Int. Cl.$^6$ .................. G06F 1/30; G06F 1/24
[52] U.S. Cl. .................. 395/750; 327/143
[58] Field of Search .................. 395/750, 182.2, 395/182.21; 364/483, 431.11, 492, 707; 327/143

[56] References Cited

U.S. PATENT DOCUMENTS

| | | | |
|---|---|---|---|
| 4,551,841 | 11/1985 | Fujita et al. | 395/182.2 |
| 4,578,774 | 3/1986 | Muller | 364/900 |
| 4,627,060 | 12/1986 | Huang et al. | 395/183.12 |
| 4,670,676 | 6/1987 | Nishitani | 327/143 |
| 4,910,463 | 3/1990 | Williams, II et al. | 324/468 |
| 5,047,987 | 9/1991 | Kosuge | 365/228 |
| 5,095,438 | 3/1992 | Sasaki | 364/431.11 |
| 5,203,000 | 4/1993 | Folkes et al. | 395/750 |
| 5,237,698 | 8/1993 | Ohmae | 395/750 |
| 5,454,113 | 9/1995 | Graf et al. | 395/750 |
| 5,506,990 | 4/1996 | Holman, Jr. | 395/750 |
| 5,539,910 | 7/1996 | Brueckmann et al. | 395/750 |
| 5,563,799 | 10/1996 | Brehmer et al. | 364/481 |
| 5,564,010 | 10/1996 | Henry et al. | 395/182.2 |

*Primary Examiner*—Gopal C. Ray

[57] ABSTRACT

A resetting apparatus for a microcomputer has a voltage detection circuit for detecting a voltage of a main power line, a reset circuit for providing a reset signal to the microcomputer, and a reset cancel circuit for controlling the reset circuit so that the reset circuit does not output the reset signal. The microcomputer enters a stand-by mode and stops outputting a watchdog pulse signal when a power source is turned off and the detected voltage of the voltage detection circuit becomes below a prescribed stand-by set voltage. When the watchdog pulse signal is stopped, the reset circuit gives the reset signal to the microcomputer. Hereby, the microcomputer is again put under an operating condition, even though the power source is turned off and the stand-by mode sets in. To avoid this, the reset cancel circuit controls the reset circuit so that the reset circuit does not output the reset signal when the detected voltage is below the stand-by set voltage. Thus, when the power source is turned off, the microcomputer surely enters the stand-by mode, and a wasteful power consumption is avoided.

19 Claims, 3 Drawing Sheets

RESETTING APPARATUS FOR A MICROCOMPUTER

This application is a continuation of application Ser. No. 08/354,853 filed on Dec. 9, 1994, now abandoned.

BACKGROUND OF THE INVENTION

The present invention relates to a resetting apparatus for a microcomputer.

FIG. 3 is a block diagram showing a conventional resetting apparatus for a microcomputer used for an automobile air-conditioning system.

In FIG. 3, a reference numeral 1 is a main power line and a reference numeral 2 is a backup power line. The main power line 1 and the backup power line 2 are connected to a 24V car-mounted battery 50. An ignition switch 51 is inserted to the main power line 1, and connection of a power source to the main power line 1 is made on and off by the ignition switch 51. A 24V constant voltage circuit 52 is also inserted to the main power line 1 so that latter circuits are protected against an overvoltage. The backup power line 2 does not have a 24V constant voltage circuit from the viewpoint of minimizing power consumption. In the backup power line 2, latter circuits are protected by a protective resistor which is described later. A power source to the backup power line 2 is supplied irrespective of an on/off condition of the ignition switch 51.

A voltage detection circuit 3 has a serial connection of a resistor 4 and a resistor 5 inserted between the main power line 1 and a ground, and a Zener diode 6 for overvoltage protection which is inserted in parallel with the resistor 5. The voltage detection circuit 3 detects a voltage of the main power line 1 by means of voltage division by resistors 4 and 5 and provides the detected voltage to an A/D terminal of a microcomputer 7. A 5V constant voltage circuit 8 is connected to the main power line 1 through a diode 9 and to the backup power line 2 through a protective resistor 10 and a diode 11. The 5V constant voltage circuit 8 provides a constant voltage of 5V to a power terminal of the microcomputer 7, a reset circuit 12, and an AVref terminal of the microcomputer 7 through a transistor 13. The reset circuit 12 receives the 5V constant voltage as a reference voltage of an internal comparator (not shown in the figure). The transistor 13 is on/off controlled by the microcomputer 7. The protective resistor 10 is set to a high resistance value from the viewpoint of protecting the 5V constant voltage circuit 8.

The microcomputer 7 recognizes a voltage value of a detected voltage which is provided from the voltage detection circuit 3 to the A/D terminal. This is recognized based on which of the voltage values the detected voltage coincides with, the voltage values being obtained by dividing the 5V constant voltage provided to the AVref terminal of the microcomputer 7 by a plurality of resistors. The microcomputer 7 enters a stand-by mode when the detected voltage from the voltage detection circuit 3 is below a prescribed stand-by set voltage. Thereby, the microcomputer 7 stops outputing a watchdog pulse signal from a WD terminal thereof, and stops power supply to components except for a RAM and other backup sections. The reset circuit 12 receives a power source from the main power line 1 through a diode 14. The reset circuit 12 provides a power-on reset signal to a RST terminal of the microcomputer 7 when the ignition switch 51 is manipulated to an on position. The reset circuit 12 also provides a reset signal to the RST terminal of the microcomputer 7 when the watchdog pulse signal from the microcomputer 7 is stopped.

In such a composition as described above, when a voltage of the main power line 1 drops by manipulating the ignition switch 51 to an off position, the detected voltage of the voltage detection circuit 3 drops below the stand-by set voltage and the microcomputer 7 enters the stand-by mode. Hereby, the microcomputer 7 stops outputing the watchdog pulse signal and stops power supply to components except for the RAM and other backup sections. The reset circuit 12 which receives an operating power source from the main power line 1 also stops operating. Under the stand-by mode condition, the microcomputer 7 is backed up through the backup power source line 2.

In the composition mentioned above, if voltage of the main power line 1 drops quickly when the ignition switch 51 is manipulated to the off position, the microcomputer 7 enters the stand-by mode and the reset circuit 12 is disabled, so that the microcomputer 7 stops under the stand-by mode condition as described above. However, since there are delay factors such as the 24V constant voltage circuit 52 in the main power line 1, voltage drop of the main power line 1 is delayed when the ignition switch 51 is manipulated to the off position. As a result, a problem occurs that the microcomputer 7 cannot quickly fall into the stand-by mode, wastefully consuming electric power. That is, if voltage drop of the main power line 1 is slow when the ignition switch 51 is manipulated to the off position, the reset circuit 12 is not disabled and provides the reset signal to the microcomputer 7 even though the microcomputer 7 has entered the stand-by mode and has stopped outputing the watchdog pulse signal. Thereby, the microcomputer 7 restarts and enters the stand-by mode again, and the reset circuit 12 provides the reset signal. That is, the stand-by mode and the reset are repeated alternately. When voltage of the main power line 1 drops further, the reset circuit 12 is disabled. However, since the 5V constant voltage circuit 8 is not able to maintain the 5V constant voltage due to a voltage drop of the main power line 1, the constant voltage provided to the AVref terminal of the microcomputer 7 drops. As a result, the microcomputer 7 erroneously recognizes that the detected voltage of the voltage detection circuit 3 is above the stand-by set voltage in spite of it being dropped below the stand-by set voltage. Thereby, the microcomputer 7 is left under the operating condition without falling into the stand-by mode. The microcomputer 7 is backed up by the backup power line 2. However, as voltage drop due to the protective resistor 10 is large because consumed current is large with the microcomputer 7 left under the operating condition, the 5V constant voltage circuit 8 cannot maintain the 5V constant voltage. Thus, even though the microcomputer 7 is backed up by the backup power line 2, the microcomputer 7 erroneously recognizes that the detected voltage of the voltage detection circuit 3 is above the stand-by set voltage, in spite of it having dropped below the stand-by set voltage, and stays under the operating condition.

SUMMARY OF THE INVENTION

It is an object of the present invention to provide an improved resetting apparatus for a microcomputer.

Another object of the present invention is to provide a resetting apparatus which can surely make the microcomputer fall into the stand-by mode when the power source is turned off.

The above and other objects are attained by a resetting apparatus for a microcomputer comprising: a main power line of which supply of a power source is made on and off by an external manipulation, said main power line having at least one delay factor which delays a voltage drop of said main power line when the power source is made off; a backup power line which is supplied with the power source regardless of said external manipulation; a voltage detection circuit for detecting a voltage of said main power line and outputting a detected voltage indicative of the voltage of said main power line; a constant voltage circuit, connected to said main power line, and to said backup power line through a protective resistor, for outputting a constant voltage; said microcomputer being supplied with an operating power by said constant voltage circuit, said microcomputer, responsive to the detected voltage of said voltage detection circuit and the constant voltage of said constant voltage circuit, recognizing a voltage value of said detected voltage based on said constant voltage, and stopping a watchdog pulse signal by entering a stand-by mode when said detected voltage becomes below a prescribed stand-by set voltage; a reset circuit which is supplied with an operating power by said main power line and supplied with the constant voltage by said constant voltage circuit, said reset circuit, responsive to the on of the power source, giving a power-on reset signal to said microcomputer, and said reset circuit, responsive to the watchdog pulse signal of said microcomputer, giving a reset signal to said microcomputer when the watchdog pulse signal is not given; and a reset cancel circuit which is supplied with an operating power by said main power line and supplied with the constant voltage by said constant voltage circuit, said reset cancel circuit, responsive to the detected voltage of said voltage detection circuit, controlling said reset circuit so that said reset circuit does not output the reset signal when the detected voltage becomes below a prescribed voltage value, and said prescribed voltage value being set smaller than said stand-by set voltage, larger than a lowest voltage of said main power line at which said constant voltage circuit can maintain said constant voltage, and higher than a voltage of said main power line at which said reset circuit and said reset cancel circuit are disabled.

These and other objects of the present application will become more readily apparent from the detailed description given hereinafter. However, it should be understood that the preferred embodiments of the invention are given by way of illustration only, since various changes and modifications within the spirit and scope of the invention will become apparent to those skilled in the art from this detailed description.

BRIEF DESCRIPTION OF THE DRAWINGS

The foregoing and other objects, features and attendant advantages of the present invention will be appreciated as the same become better understood by means of the following description and accompanying drawings wherein.

DETAILED DESCRIPTION OF THE INVENTION

Figure 1:
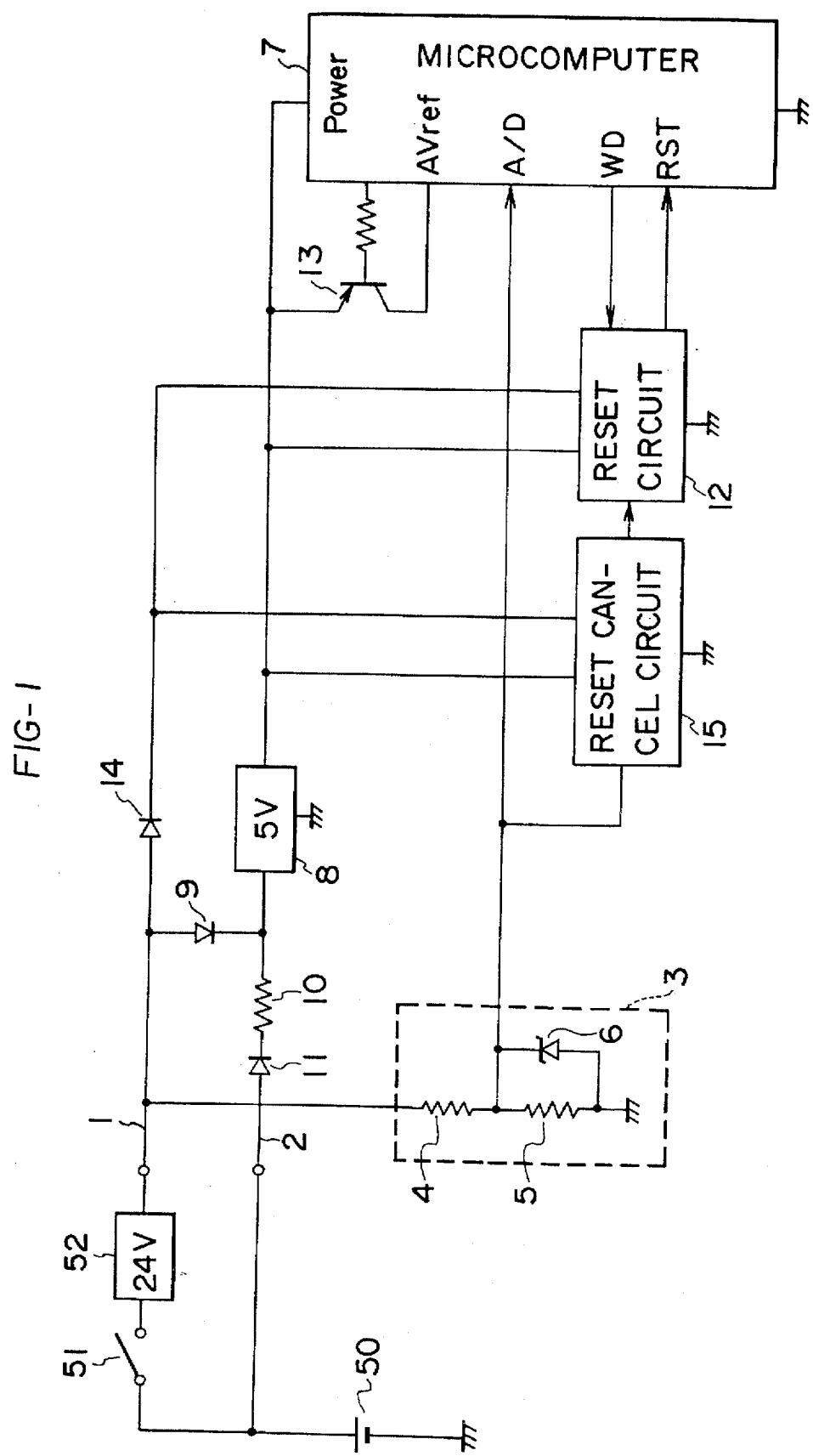
FIG. 1 is a block diagram showing an embodiment of a resetting apparatus according to the present invention.
Figure 3:
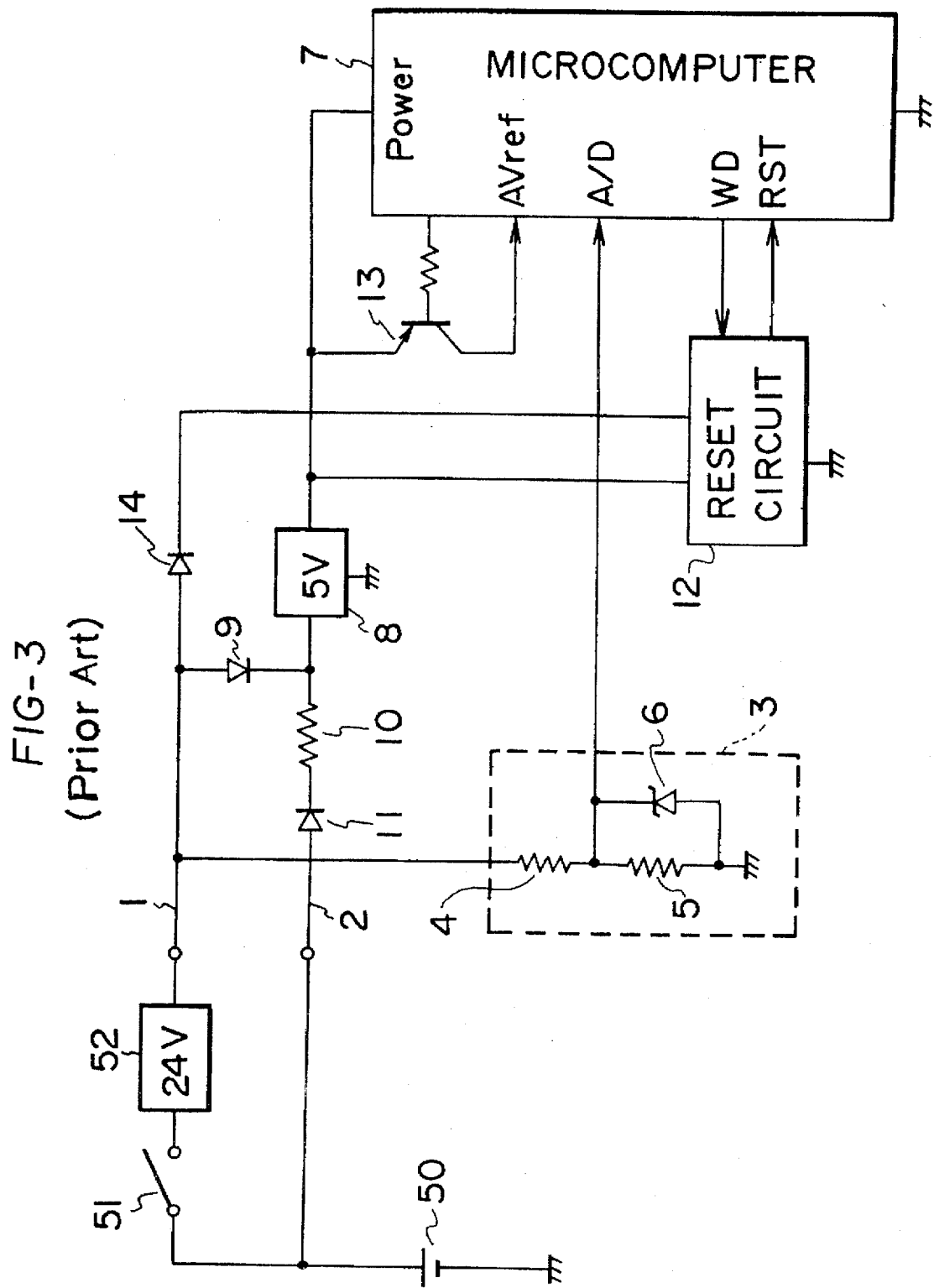
FIG. 3 is a block diagram showing a conventional resetting apparatus.

In FIG. 1, components that are given the same reference numerals as those of FIG. 3 indicate the same. A reference numeral 15 is a reset cancel circuit. An operating power source of the reset cancel circuit 15 is supplied from the main power line 1 through the diode 14. The reset cancel circuit 15 receives the 5V constant voltage of the 5V constant voltage circuit 8 as a power source for a reference voltage. The reset cancel circuit 15 receives the detected voltage of the voltage detection circuit 3, compares the detected voltage with a prescribed voltage value, and controls the reset circuit 12 so that the reset circuit 12 does not output the reset signal when the detected voltage is below the prescribed voltage value. The prescribed voltage value mentioned above is set to a value smaller than the stand-by set voltage of the microcomputer 7 and larger than a lowest voltage of the main power line 1 at which the 5V constant voltage circuit 8 can maintain the 5V constant voltage. The prescribed voltage value is also set to a value higher than a voltage of the main power line at which the reset circuit 12 and the reset cancel circuit 15 are disabled. Other composition is the same as FIG. 3.

Figure 2:
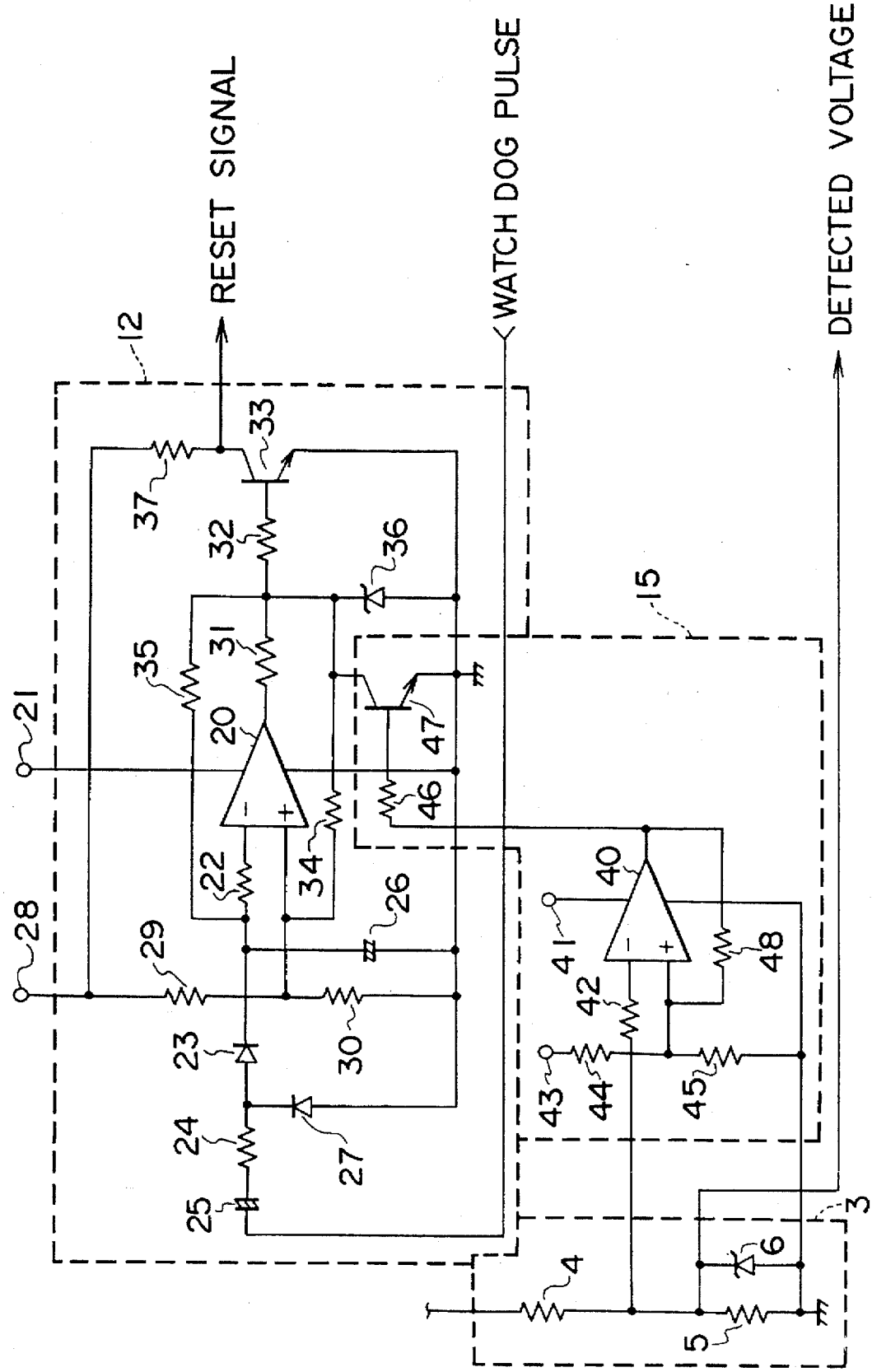
FIG. 2 is a circuit diagram showing a reset circuit and a reset cancel circuit of FIG. 1.

The reset circuit 12 and the reset cancel circuit 15 have a circuit composition shown in FIG. 2.

The reset circuit 12 has a comparator 20. A power terminal 21 of the comparator 20 is connected to the main power line 1. A negative input terminal of the comparator 20 is designed to receive the watchdog pulse signal of the microcomputer 7 through a resistor 22, a diode 23, a resistor 24 and a capacitor 25. Between the resistor 22 and the diode 23, a capacitor 26 with one end grounded is inserted. A portion between the diode 23 and the resistor 24 is grounded through a diode 27. A positive input terminal of the comparator 20 is connected between resistors 29 and 30 which are serially connected and inserted between a reference voltage terminal 28 that receives the 5V constant voltage of the 5V constant voltage circuit 8 and the ground. An output terminal of the comparator 20 is connected to a base of a switching transistor 33 through resistors 31 and 32. The output terminal of the comparator 20 is also connected to the positive input terminal of the comparator 20 through resistors 31 and 34 and to a portion between the resistor 22 and the diode 23 of the negative input terminal side of the comparator 20 through resistors 31 and 35, and is further grounded through a Zener diode 36 for overvoltage protection. A collector of the transistor 33 is connected to the reference voltage terminal 28 through a resistor 37, and its emitter is grounded. A reset signal is output from between the collector of transistor 33 and the resistor 37.

In the reset circuit 12 which is composed as described above, a first threshold level $V_H$ and a second threshold level $V_L$ which is lower than the first threshold $V_H$ are given to the positive input terminal of the comparator 20. That is, when an output of comparator 20 is a high level, the high level output of the comparator 20 is applied to the resistor 34. Thereby, the first threshold level $V_H$ divided by a parallel connection of the resistors 29 and 34 and the resistor 30 is given to the positive input terminal of the comparator 20. If the output of the comparator 20 is a low level, a low level output of the comparator 20 is applied to the resistor 34. Thus, the second threshold level $V_L$, which is divided by the resistor 29 and a parallel connection of the resistors 30 and 34 and is lower than the first threshold level $V_H$, is given to the positive input terminal of the comparator 20. When a power source is supplied to the main power line 1 by manipulating the ignition switch 51 to the on position, the reset signal of the reset circuit 12 becomes a high level because the reset circuit 12 is pulled up by the 5V constant voltage through the resistor 37. In the beginning of impression of the power source, the comparator 20 gives the high level output because the capacitor 26 is not charged. Hereby, the switching transistor 33 is made on and the reset signal falls to a low level. The capacitor 26 is charged through the resistor 35. When an electric potential of the negative input terminal of comparator 20 exceeds the first threshold level $V_H$ by charging the capacitor 26, output of the comparator 20 becomes the low level, the switching transistor 33 is made off, and the reset signal rises to the high level. Hereby, the microcomputer 7 is power-on reset and the capacitor 26 discharges through the resistor 35. By the power-on reset, the watchdog pulse signal is given from the microcomputer 7. By the watchdog pulse signal from the microcomputer 7, the capacitor 26 repeats charge and discharge. Thereby, electric potential of the negative input terminal of comparator 20 is maintained above the second threshold level $V_L$ and output of the comparator 20 stays at the high level. When voltage of the main power line 1 becomes below the stand-by set voltage by manipulating the ignition switch 51 to the off position, the microcomputer 7 enters the stand-by mode and stops the output of watchdog pulse signal. However, since the reset circuit 12 is not disabled, as described in the background of the present invention, the stand-by mode and reset are repeated. That is, when the watchdog pulse signal is not given from the microcomputer 7, the capacitor 26 is not charged. As a result, electric potential of the negative input terminal of comparator 20 becomes below the second threshold level $V_L$, and output of the comparator 20 is in the high level. Hereby, as described above, the switching transistor 33 is made on, the reset signal falls to the low level, the capacitor 26 is charged, the output of comparator 20 becomes the low level, the reset signal rises to the high level, and the reset is applied to the microcomputer 7. The reset cancel circuit 15 controls the reset circuit 12 so that the reset circuit 12 does not give the microcomputer 7 the reset signal when the microcomputer 7 enters the stand-by mode.

The reset cancel circuit 15 has a comparator 40. A power terminal 41 of the comparator 40 is connected to the main power line 1. A negative input terminal of the comparator 40 is connected between resistors 4 and 5 of the voltage detection circuit 3 through a resistor 42. A positive input terminal of the comparator 40 is connected between resistors 44 and 45. The resistors 44 and 45 are inserted between a reference voltage terminal 43 which receives the 5V constant voltage of the 5V constant voltage circuit 8 and the ground. Hereby, a prescribed voltage value, obtained by dividing the 5V constant voltage by the resistors 44 and 45, is given to the positive input terminal of the comparator 40. As described above, this prescribed voltage value is set to a value smaller than the stand-by set voltage of the microcomputer 7 and larger than the lowest voltage of the main power line 1 at which the 5V constant voltage circuit 8 can maintain the 5V constant voltage. The prescribed voltage value is also set to a value higher than a voltage of the main power line 1 at which the reset circuit 12 and the reset cancel circuit 15 are disabled. An output terminal of the comparator 40 is connected to a base of a transistor 47 through a resistor 46, and connected to the positive input terminal of the comparator 40 through a resistor 48 for hysteresis. A collector-emitter circuit of the transistor 47 is inserted between the comparator 20 output side of the reset circuit 12 and the ground. That is, the transistor 47 is connected at its collector between the resistors 31 and 32 and is grounded at its emitter.

In the reset cancel circuit 15 which is composed as described above, output of the comparator 40 becomes a high level when the detected voltage of voltage detection circuit 3 becomes below the prescribed voltage value. Hereby, the switching transistor 47 is made on and output of the comparator 20 of the reset circuit 12 becomes the low level. Since the output of comparator 20 is the low level, the reset circuit 12 does not output the reset signal. The prescribed voltage value is set to a value smaller than the stand-by set voltage of the microcomputer 7 and larger than the lowest voltage of the main power line 1 at which the 5V constant voltage circuit 8 can maintain the 5V constant voltage. The prescribed voltage value is also set to a value higher than the voltage of the main power line 1 at which the reset circuit 12 and the reset cancel circuit 15 are disabled. Thereby, when the detected voltage drops below the stand-by set voltage and the microcomputer 7 enters the stand-by mode, the reset circuit 12 is controlled by the reset cancel circuit 15 so that the reset circuit 12 does not output the reset signal if the detected voltage of voltage detection circuit 3 becomes below the prescribed voltage value. Since the prescribed voltage value is larger than the lowest voltage of the main power line 1 at which the 5V constant voltage circuit 8 can maintain the 5V constant voltage, and is higher than the voltage of the main power line 1 at which the reset circuit 12 and the reset cancel circuit 15 are disabled, the reset circuit 12 is controlled by the reset cancel circuit 15 so that the reset circuit 12 does not output the reset signal, before the reset circuit 12 and the reset cancel circuit 15 become disabled. Thus, the microcomputer 7 surely enters the stand-by mode, thereby stopping outputting of the watchdog pulse signal and stopping power supply to components except for the RAM and other backup portions. When the voltage of the main power line 1 further drops, the reset circuit 12 and the reset cancel circuit 15 are disabled, and no reset signal is output.

According to the embodiment mentioned above, when the power source is made off, the microcomputer surely enters the stand-by mode, and thereby it stops outputing the watchdog pulse signal and stops power supply to components except for the RAM and other backup portions. Thus, a wasteful power consumption can be avoided.

From the foregoing it will now be apparent that a new and improved resetting apparatus for a microcomputer has been found. It should be understood of course that the embodiment disclosed is merely illustrative and is not intended to limit the scope of the invention. Reference should be made to the appended claims, therefore, rather than the specification as indicating the scope of the invention.

What is claimed is:

1. A resetting apparatus for a microcomputer comprising:

a main power line connected to a power source through a closed switch, said main power line including at least one element delaying a voltage drop of said main power line when the power source is disconnected from the main power line by opening of the switch;

a backup power line connected to the power source irrespective of opening and closing of the switch;

a voltage detection circuit for detecting a voltage of said main power line and for outputting the detected voltage;

a constant voltage circuit, connected to said main power line and to said backup power line, for outputting a constant voltage and for supplying said microcomputer with an operating power, said microcomputer entering a stand-by mode upon said detected voltage being below a prescribed stand-by set voltage;

a reset circuit, supplied with an operating power by said main power line and supplied with the constant voltage by said constant voltage circuit, outputting a power-on reset signal to said microcomputer in response to the main power line being connected to the power source, and outputting a reset signal to said microcomputer upon failing to receive a watchdog pulse signal from the microcomputer, wherein the microcomputer fails to output watchdog pulse signal to the reset circuit in stand-by mode; and a reset cancel circuit, supplied with an operating power by said main power line and supplied with the constant voltage by said constant voltage circuit, controlling said reset circuit not to output the reset signal when the detected voltage received from the voltage detecting circuit is below a prescribed voltage value, said prescribed voltage value being smaller than said stand-by set voltage, larger than a lowest voltage of said main power line at which said constant voltage circuit can maintain said constant voltage, and higher than a voltage of said main power line for disabling said reset circuit and said reset cancel circuit, said reset cancel circuit controlling said reset circuit so that said reset circuit does not output the reset signal to the microcomputer upon the detected voltage dropping below the stand-by reset voltage and the microcomputer entering the stand-by mode, said reset cancel circuit thereby ensuring that the microcomputer enters the stand-by mode when the switch is opened.

2. The apparatus as claimed in claim 1, wherein said reset circuit comprises:

first comparator means, responsive to the main power line being connected to the power source, for outputting a first level signal;

threshold level supply means, responsive to said first comparator means, for providing a first threshold level to said first comparator means in response to output of said first level signal, and for providing said first comparator means with a second threshold level, lower than the first threshold level, when an output of said first comparator means is a second level signal;

capacitor means, charged by the first level signal of said first comparator means, inverting the first level signal output from said first comparator means to create the second level signal, and said capacitor means, responsive to the watchdog pulse signal being output from said microcomputer, maintaining the output of said first comparator means as the second level signal during the watchdog pulse signal output; and reset signal output means, responsive to said first comparator means, for outputting the reset signal when the output of said first comparator inverts from the first level signal to the second level signal.

3. The apparatus as claimed in claim 2, wherein said first comparator means comprises:

a watchdog pulse input circuit for receiving the watchdog pulse signal output from said microcomputer; and a first comparator, a negative input terminal of the first comparator being connected to said watchdog pulse input circuit, a positive input terminal of the first comparator being connected to said threshold level supply means, and an output terminal of the first comparator being connected to said reset signal output means.

4. The apparatus as claimed in claim 3, wherein said watchdog pulse input circuit comprises:

a serial connection of a first capacitor, a first resistor and a first diode; and a second diode inserted between an input side of the first diode and a ground.

5. The apparatus as claimed in claim 3, wherein the output terminal of said first comparator is further grounded through a Zener diode for overvoltage protection.

6. The apparatus as claimed in claim 3, wherein said threshold level supply means comprises:

a serial connection of a second resistor and third resistor, which receives the constant voltage of said constant voltage circuit at one end and is grounded at the other end, a portion between the second and third resistors being connected to the positive input terminal of said first comparator; and a fourth resistor inserted between the positive input terminal and the output terminal of said first comparator.

7. The apparatus as claimed in claim 6, wherein said capacitor means comprises:

a second capacitor inserted between the negative input terminal of said first comparator and the ground; and a fifth resistor inserted between the negative input terminal and the output terminal of said first comparator.

8. The apparatus as claimed in claim 7, wherein said reset signal output means comprises:

a first switching transistor, a base of the first switching transistor being connected to the output terminal of said first comparator through a sixth resistor, an emitter of the first switching transistor being connected to ground, and a collector of the first switching transistor receiving the constant voltage of said constant voltage circuit through a seventh resistor, the reset signal being output from between said first switching transistor and said seventh resistor.

9. The apparatus as claimed in claim 2, wherein said reset cancel circuit comprises:

reference voltage means for providing said prescribed voltage value;

second comparator means, responsive to said voltage detection circuit and said reference voltage means, for outputting a reset cancel signal when said detected voltage is below said prescribed voltage value; and switching means, responsive to said second comparator means, for grounding an output side of the first comparator means of said reset circuit when said second comparator means outputs the reset cancel signal.

10. The apparatus as claimed in claim 9, wherein said reference voltage means includes a serial connection of an eighth resistor and a ninth resistor, receiving the constant voltage of said constant voltage circuit at one end and being grounded at the other end.

11. The apparatus as claimed in claim 10, wherein said second comparator means comprises:

a second comparator, a negative input terminal of the second comparator being connected to said voltage detection circuit through a tenth resistor, a positive input terminal of the second comparator being connected between the eighth and ninth resistors of said reference voltage means, and an output terminal of the second comparator being connected to said switching means; and a hysteresis resistor inserted between the positive input terminal and the output terminal of said second comparator.

12. The apparatus as claimed in claim 11, wherein said switching means includes a second switching transistor, a base of the second switching transistor being connected to the output terminal of said second comparator through an eleventh resistor, the second switching transistor being inserted at its collector-emitter terminals between the output terminal of the first comparator of said reset circuit and the ground.

13. The apparatus as claimed in claim 1, wherein said reset cancel circuit comprises:

reference voltage means for supplying said prescribed voltage value;

second comparator means, responsive to said voltage detection circuit and said reference voltage means, for outputting a reset cancel signal when said detected voltage is below said prescribed voltage value; and switching means, responsive to said second comparator means, for controlling said reset circuit to prevent said reset circuit from outputting the reset signal when said second comparator means outputs the reset cancel signal.

14. A resetting apparatus for a microcomputer comprising:

voltage detection means for detecting a voltage supplied to the microcomputer;

reset means for outputting a reset signal to the microcomputer in response to detecting connection between the microcomputer and an external voltage source, and for outputting a reset signal to the microcomputer upon failure to receive a watchdog signal from the microcomputer, the microcomputer failing to output the watchdog signal upon entering a stand-by mode;

reset cancelling means for comparing the detected voltage received from the voltage detection means to a predetermined voltage and for preventing the reset means from outputting the reset signal to the microcomputer upon determining that the detected voltage is below the predetermined voltage, the predetermined voltage being less than a voltage below which the microcomputer enters the stand-by mode and being greater than a voltage below which the reset means and reset cancelling means are disabled, said reset cancelling means preventing said reset means from outputting the reset signal to the microcomputer upon the detected voltage dropping below the voltage below which the microcomputer enters the stand-by mode, said reset cancelling means ensuring that the microcomputer enters the stand-by mode when the connection between the microcomputer and the external voltage source is disrupted.

15. The resetting apparatus of claim 14, wherein the microcomputer is further connected to a constant voltage source, for supplying constant voltage to the microcomputer irrespective of any connection between the microcomputer and the external voltage source, the predetermined voltage further being greater than a lowest voltage of a main power line, connecting the external voltage source to the microcomputer through a switch, at which the constant voltage source can maintain the constant voltage.

16. The resetting apparatus of claim 15, wherein said reset means comprises:

first comparator means, responsive to the main power line being connected to the external voltage source, for outputting a first signal;

threshold level supply means, responsive to said first comparator means, for providing a first threshold level to said first comparator means in response to output of said first signal, and for providing said first comparator means with a second threshold level, lower than the first threshold level, when an output of said first comparator means is a second signal;

capacitor means, charged by the first signal of said first comparator means, inverting the first signal output from said first comparator means to create the second signal, and said capacitor means, responsive to the watchdog signal being output from said microcomputer, maintaining the output of said first comparator means as the second signal during the watchdog pulse signal output; and reset signal output means, responsive to said first comparator means, for outputting the reset signal when the output of said first comparator inverts from the first signal to the second signal.

17. The resetting apparatus of claim 16, wherein said first comparator means comprises:

a watchdog pulse input circuit for receiving the watchdog signal output from said microcomputer; and a first comparator, a negative input terminal of the first comparator being connected to said watchdog pulse input circuit, a positive input terminal of the first comparator being connected to said threshold level supply means, and an output terminal of the first comparator being connected to said reset signal output means.

18. The apparatus of claim 15, wherein said reset cancelling means comprises:

reference voltage means for supplying said predetermined voltage;

second comparator means, responsive to said voltage detection means and said reference voltage means, for outputting a reset cancel signal when said detected voltage is below said predetermined voltage; and switching means, responsive to said second comparator means, for controlling said reset means to prevent said reset means from outputting the reset signal when said second comparator means outputs the reset cancelling signal.

19. The resetting apparatus of claim 14, wherein the microcomputer enters the stand-by mode upon the detected voltage being below a predetermined stand-by voltage.

* * * * *